(12) United States Patent
FrantzDale

(10) Patent No.: US 11,926,105 B2
(45) Date of Patent: Mar. 12, 2024

(54) TECHNIQUES FOR DESIGNING AND FABRICATING SUPPORT STRUCTURES IN ADDITIVE FABRICATION AND RELATED SYSTEMS AND METHODS

(71) Applicant: Formlabs, Inc., Somerville, MA (US)

(72) Inventor: Benjamin FrantzDale, Harvard, MA (US)

(73) Assignee: Formlabs, Inc., Somerville, MA (US)

( * ) Notice: Subject to any disclaimer, the term of this patent is extended or adjusted under 35 U.S.C. 154(b) by 458 days.

(21) Appl. No.: 16/835,991

(22) Filed: Mar. 31, 2020

(65) Prior Publication Data

US 2020/0307108 A1    Oct. 1, 2020

Related U.S. Application Data

(60) Provisional application No. 62/827,388, filed on Apr. 1, 2019.

(51) Int. Cl.
| | | |
|---|---|---|
| *B29C 64/40* | (2017.01) | |
| *B29C 64/129* | (2017.01) | |
| *B29C 64/268* | (2017.01) | |
| *B29C 64/386* | (2017.01) | |
| *B33Y 10/00* | (2015.01) | |
| *B33Y 50/00* | (2015.01) | |

(52) U.S. Cl.
CPC ............ *B29C 64/40* (2017.08); *B29C 64/386* (2017.08); *B29C 64/129* (2017.08); *B29C 64/268* (2017.08); *B33Y 10/00* (2014.12); *B33Y 50/00* (2014.12)

(58) Field of Classification Search
CPC ........ B29C 64/40; B29C 64/386; B33Y 10/00
See application file for complete search history.

(56) References Cited

U.S. PATENT DOCUMENTS 5,595,703 A * 1/1997 Swaelens ............... A61B 17/58
427/512
10,105,897 B2  10/2018 Weitzel et al.
(Continued)

OTHER PUBLICATIONS

"Removing Supports" (Tips and Tricks—Removing Supports, Available Feb. 19, 2018, <https://www.youtube.com/watch?v=TIR0AISivF0>) (Year: 2018).*
(Continued)

*Primary Examiner* — Matthew J Daniels
*Assistant Examiner* — Hana C Page
(74) *Attorney, Agent, or Firm* — Wolf, Greenfield & Sacks, P.C.

(57) ABSTRACT

According to some aspects, techniques are described for generating support structures that may be easily removed after fabrication yet provide sufficient structural support during fabrication. In some cases, the techniques may include tuning an extent to which pillars of a support structure are interconnected to one another in regions proximate to the part. In some cases, the techniques may include fabricating very small contact structures, referred to herein as "hair" supports, in regions of a support structure where it connects with the part. In some cases, the techniques may include generating support structures that comprise obliquely-angled tips, which allow forces during fabrication to be applied in a preferred direction even when the support structure does not make a connection to the part in the preferred direction.

12 Claims, 14 Drawing Sheets

(56) References Cited

U.S. PATENT DOCUMENTS

| | | | |
|---|---|---|---|
| 10,384,263 | B2 | 8/2019 | Craeghs et al. |
| 2015/0066178 | A1 | 3/2015 | Stava |
| 2015/0360421 | A1 | 12/2015 | Burhop et al. |
| 2016/0136896 | A1* | 5/2016 | Wighton ............... B33Y 50/00 700/120 |
| 2016/0175932 | A1* | 6/2016 | Dimter .................. B23K 37/04 219/76.1 |
| 2018/0065311 | A1 | 3/2018 | Lefebvre et al. |
| 2021/0080929 | A1 | 3/2021 | FrantzDale et al. |

OTHER PUBLICATIONS

Daniel Kelly, "3D Printing: Rafts, Brooms, Supports, and Skirts." (Available Nov. 27, 2017)<https://www.drdanielkelly.com/resources/3dprinting/> (Year: 2017).*

International Search Report and Written Opinion dated Dec. 11, 2020 in connection with International Application No. PCT/US2020/025945.

Invitation to Pay Additional Fees in connection with International Application No. PCT/US2020/025945, dated Oct. 5, 2020.

International Preliminary Report on Patentability dated Oct. 14, 2021 in connection with International Application No. PCT/US2020/025945.

U.S. Appl. No. 17/026,638, filed Sep. 21, 2020, FrantzDale et al.

PCT/US2020/025945, Oct. 5, 2020, Invitation to Pay Additional Fees.

\* cited by examiner

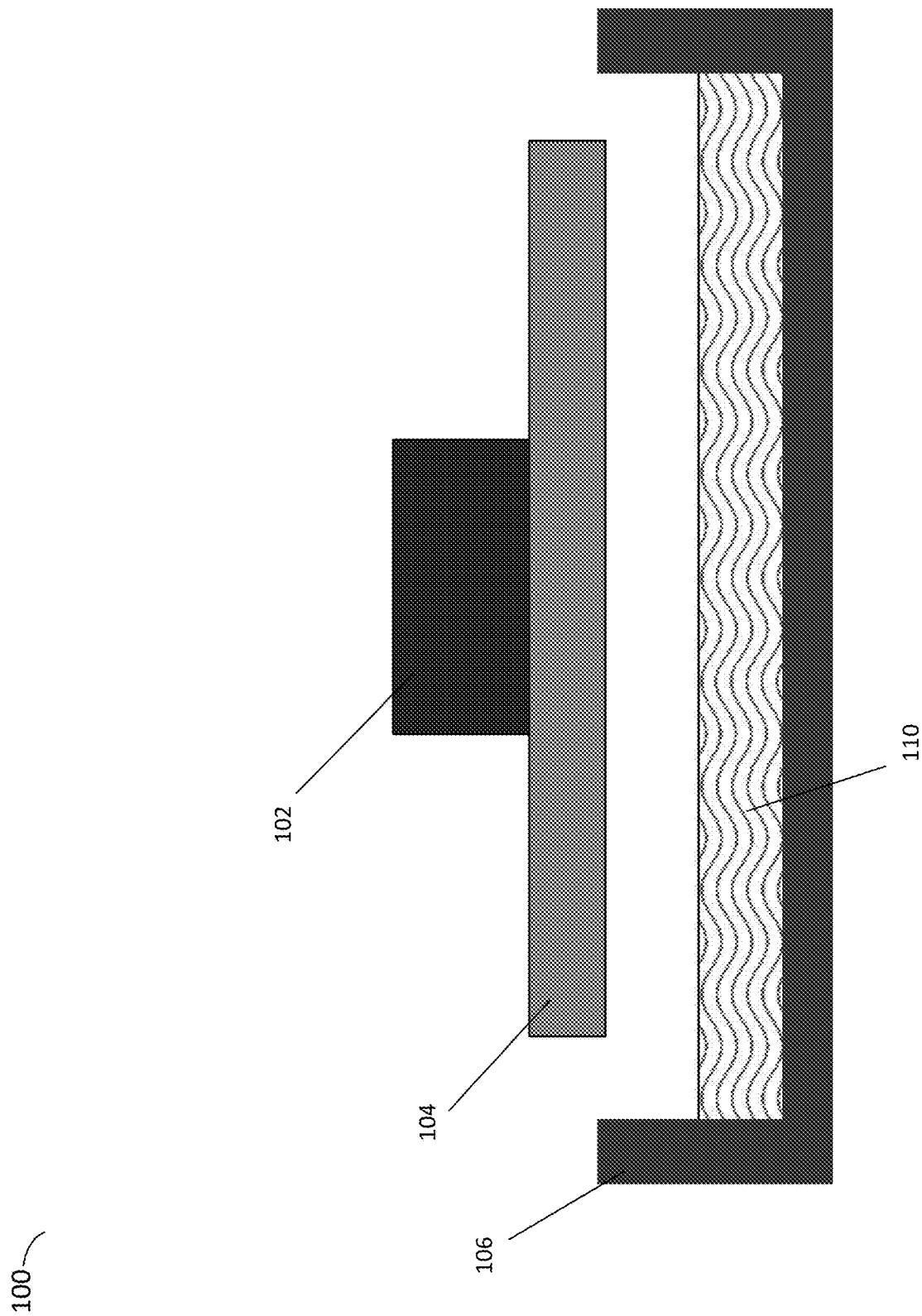

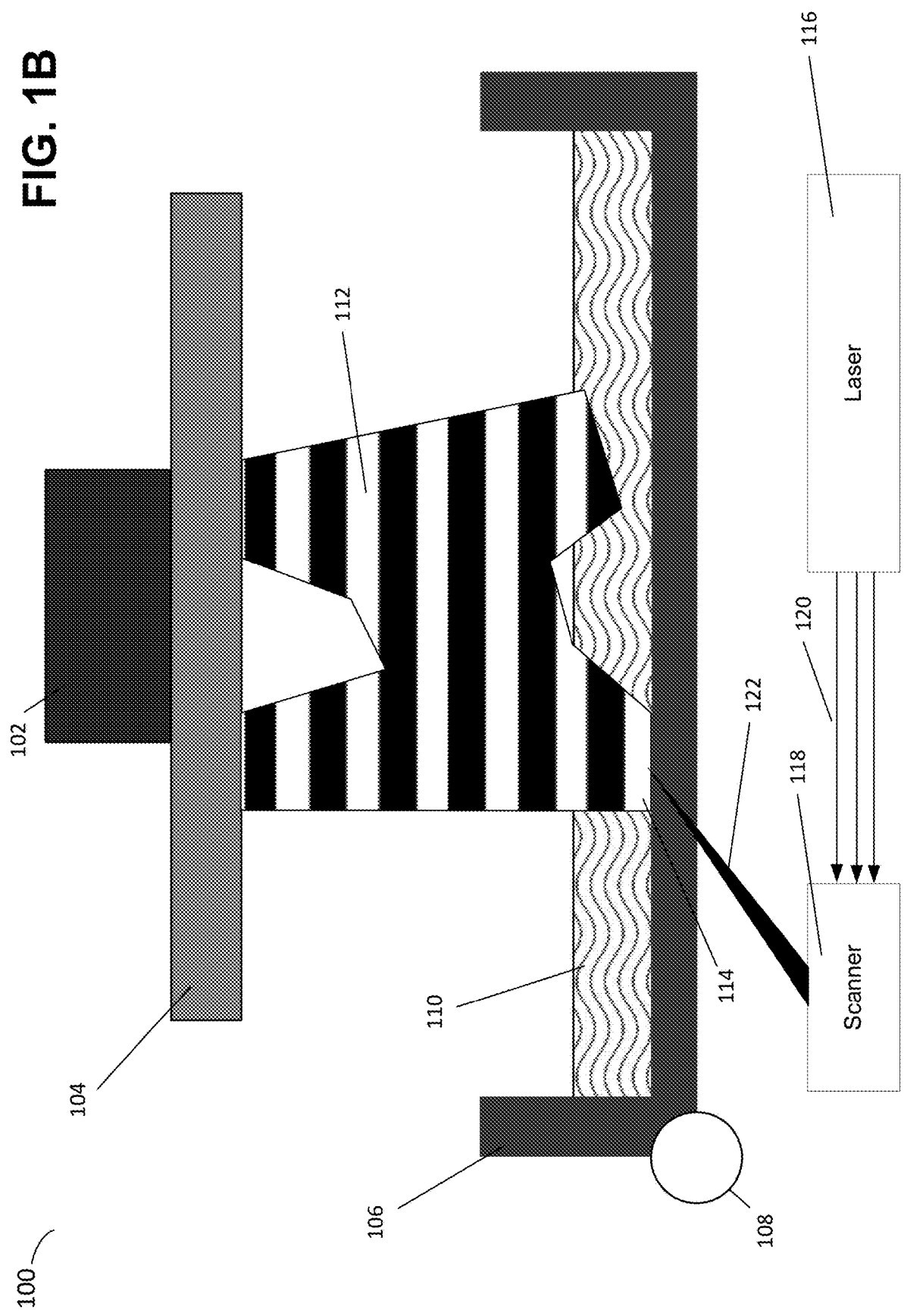

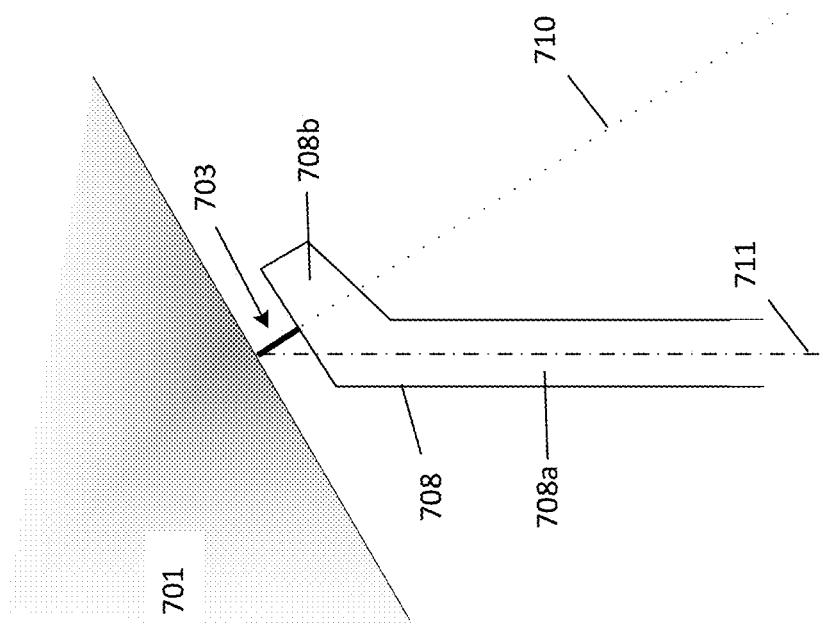

TECHNIQUES FOR DESIGNING AND FABRICATING SUPPORT STRUCTURES IN ADDITIVE FABRICATION AND RELATED SYSTEMS AND METHODS

CROSS-REFERENCE TO RELATED APPLICATIONS

The present application claims the benefit under 35 U.S.C. § 119(e) of U.S. Provisional Patent Application No. 62/827,388, filed Apr. 1, 2019, titled "Techniques For Designing And Fabricating Support Structures In Additive Fabrication And Related Systems And Methods," which is hereby incorporated by reference in its entirety.

BACKGROUND

Additive fabrication, e.g., 3-dimensional (3D) printing, provides techniques for fabricating objects, typically by causing portions of a building material to solidify at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering or combinations thereof. Many additive fabrication techniques build parts by forming successive layers, which are typically cross-sections of the desired object. Typically each layer is formed such that it adheres to either a previously formed layer or a substrate upon which the object is built.

In one approach to additive fabrication, known as stereolithography, solid objects are created by successively forming thin layers of a curable polymer resin, typically first onto a substrate and then one on top of another. Exposure to actinic radiation cures a thin layer of liquid resin, which causes it to harden, change physical properties, and adhere to previously cured layers or the bottom surface of the build platform. In such techniques as stereolithography, the object is formed by moving an area of incident actinic radiation across the layer of liquid resin to complete the cross section of the object being formed. An area of incident actinic radiation could be caused by any light source(s), such as by a laser.

SUMMARY

According to some aspects, a computer-implemented method is provided of generating a support structure for an object represented by a three-dimensional model, the support structure and the object to be fabricated via additive fabrication, the method comprising generating, using at least one processor, a support structure for the object, the support structure comprising a plurality of support pillars, a plurality of contact structures coupling support pillars of the plurality of support pillars to the object, and a plurality of trusses, wherein trusses of the plurality of trusses couple to different support pillars of the plurality of support pillars at opposing ends of the truss, and wherein placement of trusses of the plurality of trusses relative to the object is determined based at least in part on an untrussed length, and providing instructions to an additive fabrication device that, when executed by the additive fabrication device, cause the additive fabrication device to fabricate the object and the support structure.

According to some aspects, at least one non-transitory computer-readable medium is provided comprising instructions that, when executed by at least one processor, perform a method of generating a support structure for an object represented by a three-dimensional model, the support structure and the object to be fabricated via additive fabrication, the method comprising generating, using at least one processor, a support structure for the object, the support structure comprising a plurality of support pillars, a plurality of contact structures coupling support pillars of the plurality of support pillars to the object, and a plurality of trusses, wherein trusses of the plurality of trusses couple to different support pillars of the plurality of support pillars at opposing ends of the truss, and wherein placement of trusses of the plurality of trusses relative to the object is determined based at least in part on an untrussed length, and providing instructions to an additive fabrication device that, when executed by the additive fabrication device, cause the additive fabrication device to fabricate the object and the support structure.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 1A-1B depict an illustrative additive fabrication system, according to some embodiments;

FIG. 7 illustrates an alternate support connected to a support hair, according to some embodiments;

DETAILED DESCRIPTION

Figure 2A:
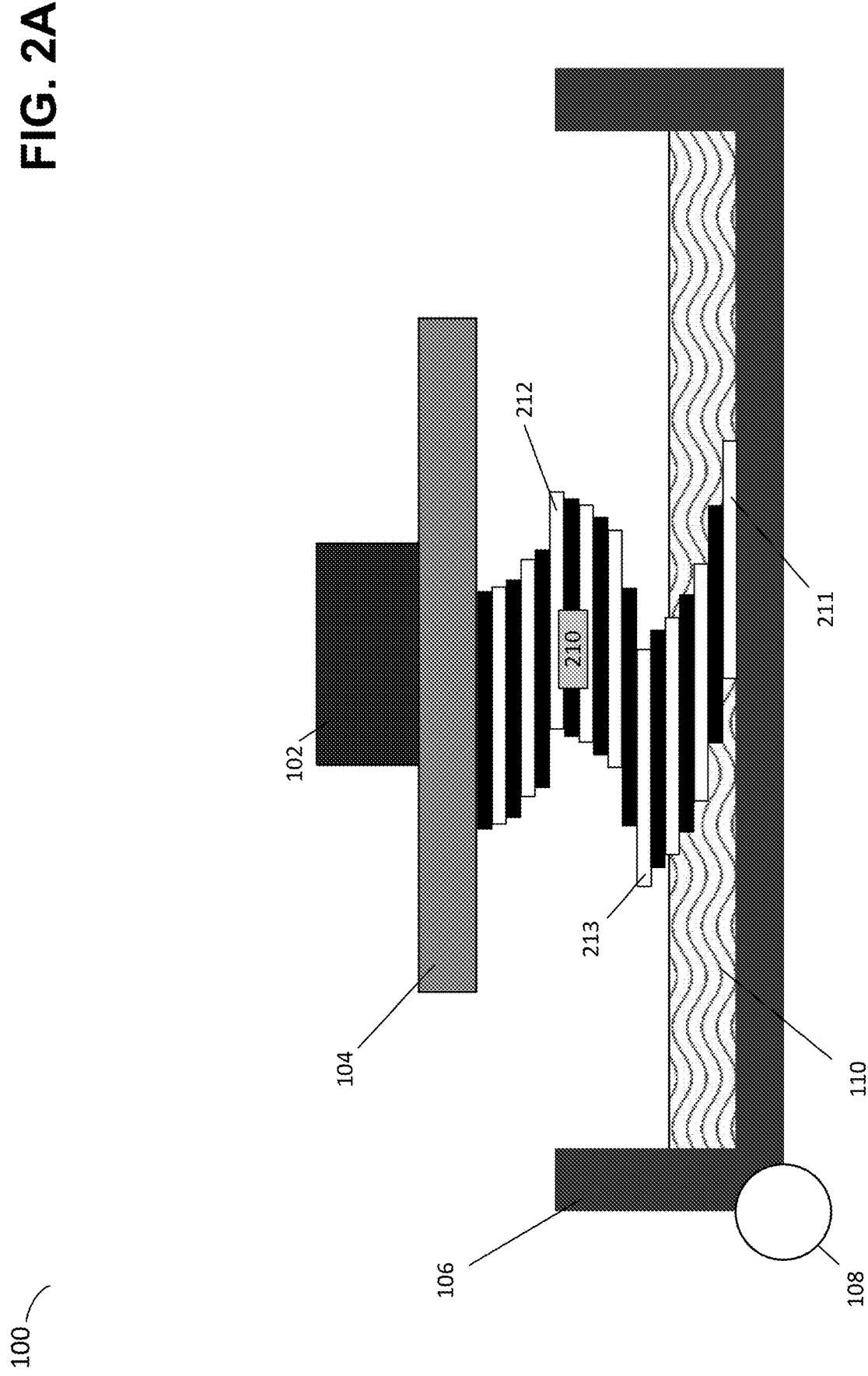
FIGS. 2A-2B depict an illustrative additive fabrication system fabricating a part having overhangs, according to some embodiments.

As discussed above, in stereolithography a plurality of layers of material are formed by directing actinic radiation onto regions of a liquid photopolymer, which causes the photopolymer to cure and harden in those regions. In stereolithography, as well as a number of other additive fabrication techniques, layers are often formed that overhang or otherwise do not connect to previously formed material. Such layers may lack sufficient structural support to remain planar, in part because the layers may be tens or hundreds of microns in thickness, but also because forces may be applied to these layers during fabrication that could cause them to deform.

As a result, many additive fabrication techniques employ some form of support structure, which is an additional structure or "scaffold" that may be fabricated to support particular regions of a part during its fabrication. Once the part has completed fabrication, the support structure can be removed. While support structures can aid in successful fabrication of certain parts, support structures may also lead to defects and/or poor surface finish on those parts and may cause a user to spend significant effort in removing the structures and/or smoothing the surface.

Preferably, support structures supply enough mechanical strength during fabrication so that parts are fabricated correctly and do not deform or are otherwise negatively impacted during fabrication. Conversely, however, support structures are preferably also easy to remove with minimal application of force or other effort subsequent to fabrication. These apparently conflicting goals may present a challenge when determining how best to fabricate a support structure for a given part.

The inventors have recognized and appreciated multiple techniques for generating support structures that may be easily removed after fabrication yet provide sufficient structural support during fabrication. In some cases, the techniques may include tuning an extent to which pillars of a support structure are interconnected to one another in regions proximate to the part. In some cases, the techniques may include fabricating very small contact structures, referred to herein as "hair" supports, in regions of a support structure where it connects with the part. In some cases, the techniques may include generating support structures that comprise obliquely-angled tips, which allow forces during fabrication to be applied in a preferred direction even when the support structure does not make a connection to the part in the preferred direction. Support structures that are generated and/or fabricated using any one or more of these techniques may be referred to herein as "tearaway supports."

To provide one illustrative example of an additive fabrication process in which the techniques described herein may be employed, FIGS. 1A-1B depict an illustrative additive fabrication system. Illustrative stereolithographic printer 100 forms a part in a downward facing direction on a build platform such that layers of the part are formed in contact with a surface of a container in addition to a previously cured layer or the build platform. In the example of FIGS. 1A-1B, stereolithographic printer 100 comprises build platform 104, container 106 and liquid photopolymer 110. A downward facing build platform 104 opposes the floor of container 106, which contains a liquid photopolymer (e.g., a liquid photopolymer resin) 110. FIG. 1A represents a configuration of stereolithographic printer 100 prior to formation of any layers of a part on build platform 104.

As shown in FIG. 1B, a part 112 may be formed layerwise, with the initial layer attached to the build platform 104. In FIG. 1B, the layers of the part 112 are each formed from the same material but are shown in alternating shades merely to visually distinguish them in this example. The container's base surface may be transparent to actinic radiation, such that radiation can be targeted at portions of the thin layer of liquid photocurable photopolymer resting on the base surface of the container. Exposure to actinic radiation cures a thin layer of the liquid photopolymer, which causes it to harden. The layer 114 is at least partially in contact with both a previously formed layer and the surface of the container 106 when it is formed. The top side of the cured photopolymer layer typically bonds to either the bottom surface of the build platform 104 or with the previously cured photopolymer layer in addition to the transparent floor of the container. In order to form additional layers of the part subsequent to the formation of layer 114, any bonding that occurs between the transparent floor of the container and the layer must be broken. For example, one or more portions of the surface (or the entire surface) of layer 114 may adhere to the container such that the adhesion must be removed prior to formation of a subsequent layer. In some embodiments, the layer 114 may be separated from the container via some relative motion of the container and part 112, such as sliding the container, rotating the container, moving the build platform away from the container, or combinations thereof.

In order to cure the layer 114 by exposure to actinic radiation, the stereolithographic printer 100 may use the laser 116 and scanner system 118 to produce a laser beam 122. The laser 116 can produce laser light rays 120 which are directed to the scanner system 118. The scanner system 118 directs a laser beam 122 to a location of the build volume. The laser beam 122 may have a spot size comprising a size of the laser beam incident on the location of the build volume. Exposure of a portion of the liquid photopolymer 110 to the laser cures the portion of the liquid photopolymer. For example, when an entire portion of the build volume of layer 114 has been exposed to the laser beam 122, layer 114 of the part 112 may be formed. The scanner system 118 may include any number and type of optical components, such as multiple galvanometers and/or lenses that may be operated to direct the light emitted by laser 116.

Following the curing process, a separation process is typically conducted so as to break any bonds that may have been produced between the cured material of layer 114 and the bottom of container 102. Various techniques may be employed to separate the layers, include rotation and/or sliding the container relative to the build platform. As one example, build platform 104 may be moved away from the container to reposition the build platform for the formation of a new layer and/or to impose separation forces upon any bonds between cured and/or partially cured material and the bottom of the container. In some implementations, the container 106 may be mounted onto a support base such that the container can be moved along a horizontal axis of motion (left or right in FIG. 1B) to introduce additional separation forces.

The illustrative device of FIGS. 1A-1B is provided as one example, and it will be appreciated that the techniques described herein are also applicable to other types of additive fabrication devices, including other stereolithography devices such as those that utilize a container comprising a thin film, and that scan light across the container in various ways. Moreover, the techniques described herein may be applicable to other types of additive fabrication and are not limited to use with stereolithography. For instance, the techniques described herein relate to design and fabrication of support structures and accordingly the techniques may be applicable to any additive fabrication technique or process in which a part may be designed and/or fabricated with a support structure.

Figure 2B:
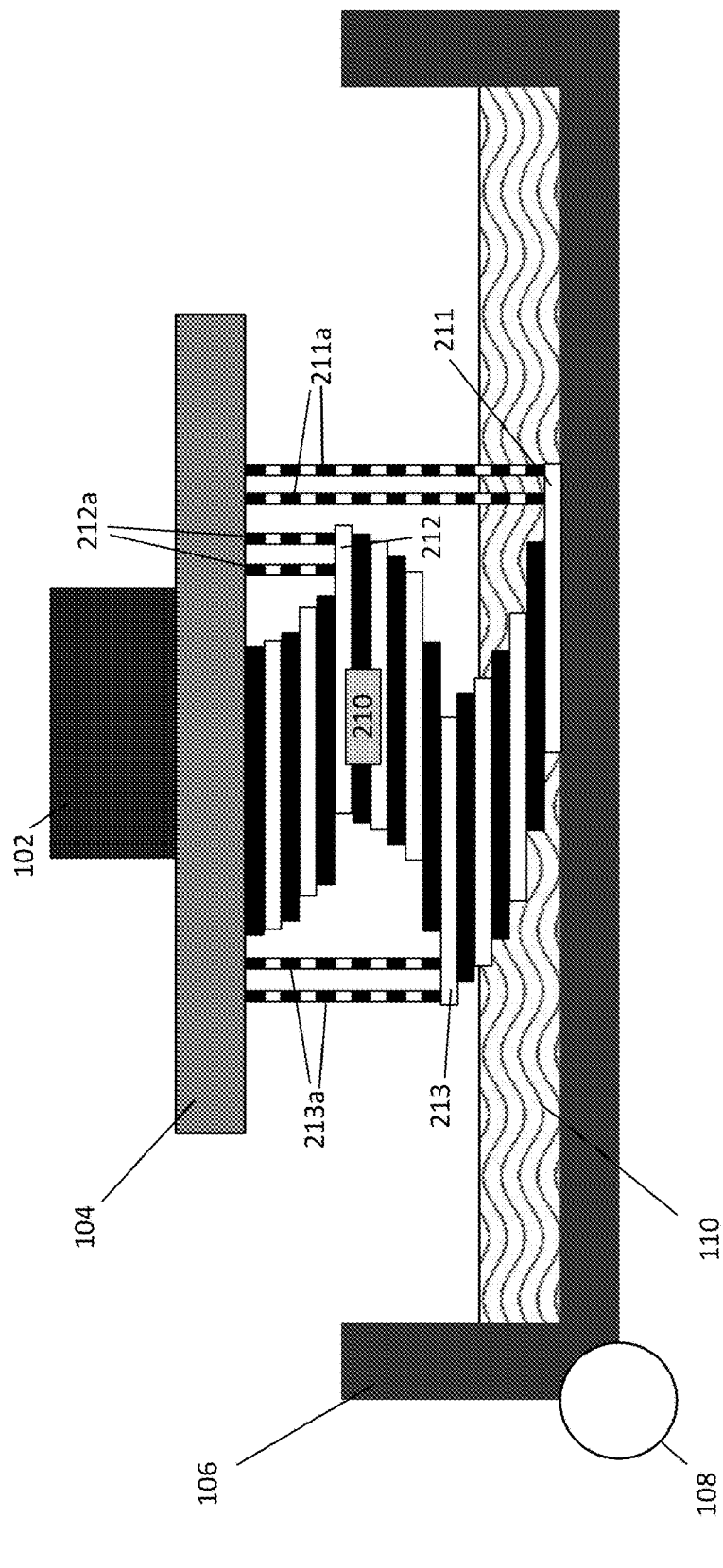

In the example of FIGS. 1A-1B, forces applied to a layer during fabrication may include forces applied when separating the layer from the container 102 and/or gravitational forces pulling a layer downward. An illustrative part 210 including layers 211, 212 and 213 is shown in FIGS. 2A-2B as being fabricated by the stereolithographic printer 100 of FIGS. 1A-1B. While the height of the layers of the part 210 are, as with part 112 of FIGS. 1A-1B, not illustrated to scale, the layers in FIGS. 2A-2B are illustrated with a lower thickness compared with those in FIGS. 1A-1B for clarity.

As may be noted from FIG. 2A, the layers 211, 212 and 213 of part 210 each overhang earlier formed layers of the part (recalling that, as noted above, the layers are formed starting on the build platform 104 and subsequently formed one after another in a downward direction). During fabrication, if the part 210 is formed as illustrated any one or more of these layers may be deformed or otherwise damaged during fabrication. For instance, in some cases the force of the movement during separation of the layer from the container may tear the newly formed layer causing a portion of the part or layer to remain adhered to the container. For example, in the state shown in FIG. 2A wherein the layer 211 has just been formed and is in contact with the container 106, the act of separating the layer 211 from the container may cause damage to the layer (and in some cases, damage to other layers as well) because the layer 211 overhangs the previously formed layer (the layer immediately above layer 211 in FIG. 2A). In some cases, the layers of the part 210 may be tens of microns in thickness, and so applying a force to the part through a layer such as layer 211 may easily cause deformation of the structure of the part, particularly the rightmost part which extends beyond the previously formed layer (i.e., the overhang).

FIG. 2B depicts the part 210 of FIG. 2A again being fabricated by the stereolithographic printer 100, wherein a support structure comprising support pillars 211a, 212a and 213a is also being fabricated. While various different types of support structure shapes may be envisioned, as can be seen from the example of FIG. 2B, when the layers 211, 212 and 213 are formed, they are formed in contact with respective support pillars 211a, 212a and 213a. The support pillars may provide sufficient mechanical support so as to avoid deformation of these layers when the part is separated from the container 106 (via some relative motion of the part and container, as discussed above).

Figure 3:
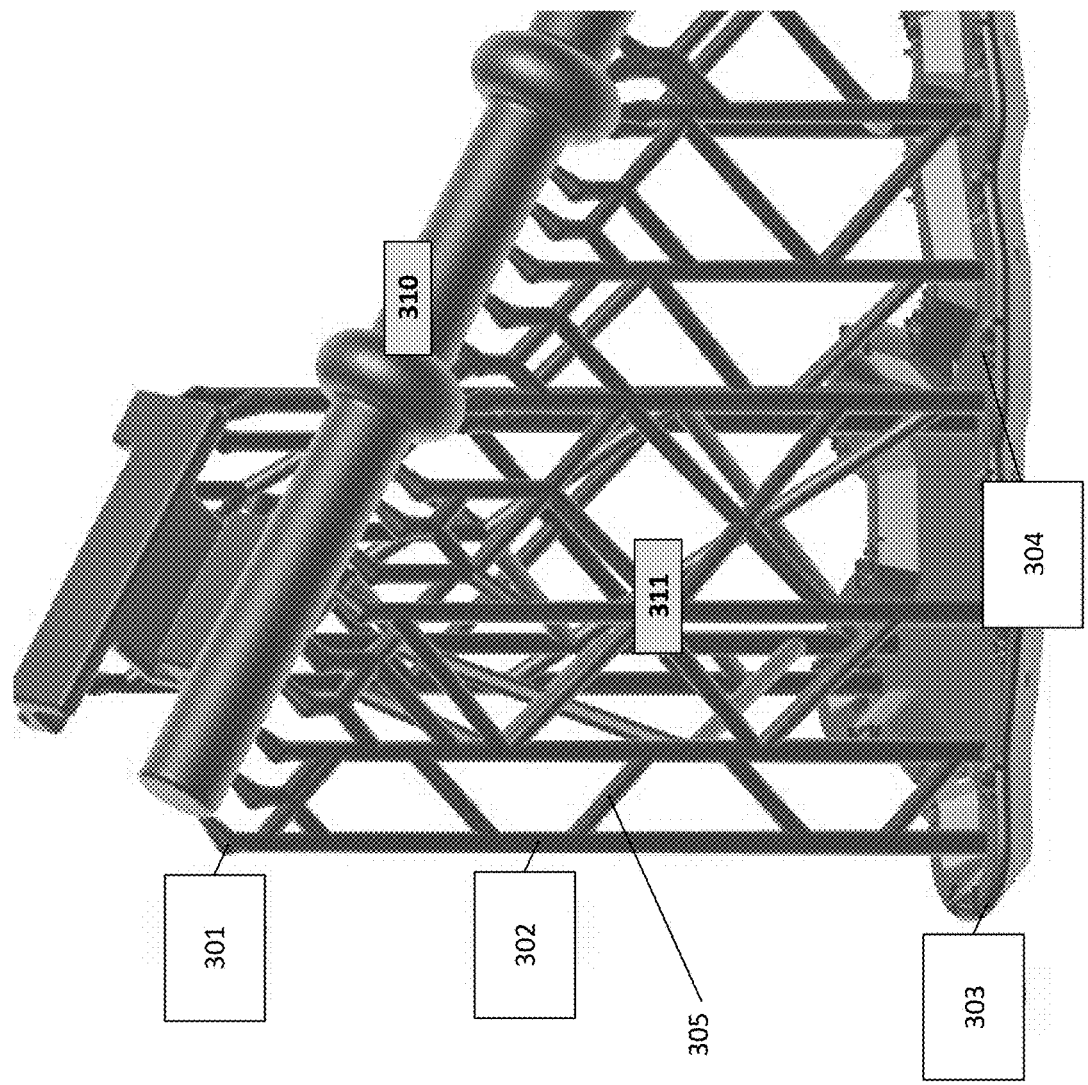
FIG. 3 illustrates an example of a support structure, according to some embodiments.

Another example of a support structure is illustrated in FIG. 3, which depicts a cylindrical part 310 fabricated on a support structure 311. The support structure includes pillars 302, being vertical features that provide a connection between the top and bottom of the support structure. In the example of FIG. 3, the support pillars 302 are coupled to the part 310 via support tips 301, which have an orientation that may be determined based on the surface normal of the part at the point of contact. Support tips are a type of contact structure and techniques for generating support tips are described further in U.S. Pat. No. 9,183,325, titled "Additive Fabrication Support Structures," which is hereby incorporated by reference in its entirety. The support pillars 302 are also connected to a raft structure 303, which is formed on the build platform and may, for instance, provide a rigid structure on which the remaining support structure may be formed. In the example of FIG. 3, the raft 303 includes text 304 that identifies the part 310.

Furthermore in the example of FIG. 3, some of the support pillars 302 are connected to one or more of the other support pillars via one or more trusses 305. The trusses may provide additional structural support to a support pillar and inhibit the pillar from flexing or otherwise deforming during fabrication. In some cases, a truss may aid in distributing force between multiple support pillars.

The inventors have recognized and appreciated that vertical support pillars may primarily be loaded axially (and primarily in tension) during fabrication, yet after fabrication, the pillars are easily loaded transversely or rotationally for support removal. That is, the forces typically experienced during fabrication by a support pillar may be directed along the axis of the support pillar (e.g., vertically in the example of FIG. 2B), whereas when manually removing the support structure from the part after fabrication, a user may easily direct a force in a different manner, whether using their hands and/or a suitable tool.

While trussing support pillars (i.e., connecting support pillars via one or more trusses) can provide a support structure with desirable structural properties as discussed above, trussing also may increase the total force necessary to remove a support structure from a part, may limit a user's ability to remove any individual support pillar, and/or may otherwise impede the removal process. For support removal it may be desirable to be able to easily apply stress to individual contact structures. In contrast, if contact structures are strongly connected to other nearby contact structures and/or support pillars, then the contact structures may effectively act as a unitary structure, and significant force may be required to detach any one of them. This excess required force may make it more likely for users to damage the part, break off fine or brittle features, or cause injury to themselves or others as portions of the support structure may snap causing portions to fly. In the example of FIG. 3, for instance, trusses may be seen connecting support pillars close to various contact structures, which may cause these contact structures to be difficult to remove from the part.

The inventors have further recognized and appreciated that tuning an extent to which pillars of a support structure are interconnected to one another in regions proximate to the part may mitigate the above-described challenges. In particular, a support structure may be configured so that support pillars are not connected to (or are not permitted during generation of the support structure to be connected to) any other support pillars (are "untrussed") within a particular distance from the part. For instance, during design of a support structure, a first support pillar may be connected to (or may be permitted to connect to) one or more other support pillars at points on the first support pillar that are at or further than a threshold distance from the part, and may not be connected to (or may not be permitted to connect to) any other support pillar at points on the first support pillar that are within the threshold distance. This arrangement may thereby produce a support structure that exhibits an "untrussed" length at the top of support pillars.

According to some embodiments, a support structure having an untrussed portion at the top of some or all of its support structures may be configured to have an increased amount of trussing between support pillars at just below the untrussed portion. That is, the density of trussing just below a "trussing line," being a line of fixed distance from the part, may be higher than would normally be applied when the support pillars would be trussed along their entire length.

Above the trussing line, the support pillars may be untrussed. This approach may limit the impact of any irregularities in the stiffness of the trussed network below the trussing line. In some cases, the trusses line may isolate the degrees of freedom considered so that forces within the support structure may be simulated more easily by only considering the support from the untrussed network. Since the higher density trussing region may be expected to act as a rigid bottom layer, the structure below the trusses line may be assumed to not impact, or to minimally impact, the formation of the part.

Figure 4B:
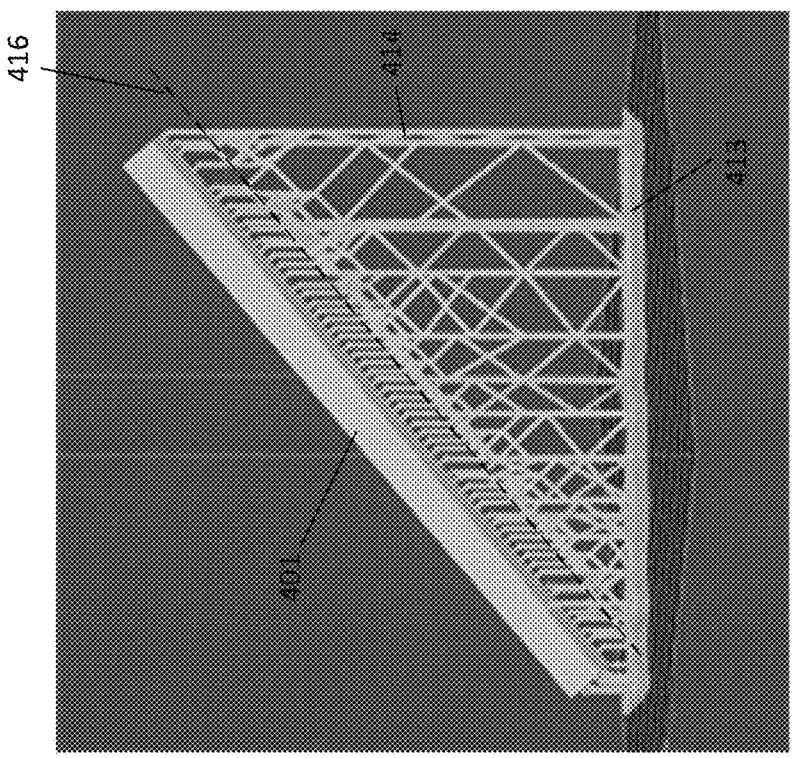
FIGS. 4A-4B are perspective views of illustrative support structures generated for a part, according to some embodiments.
Figure 4A:
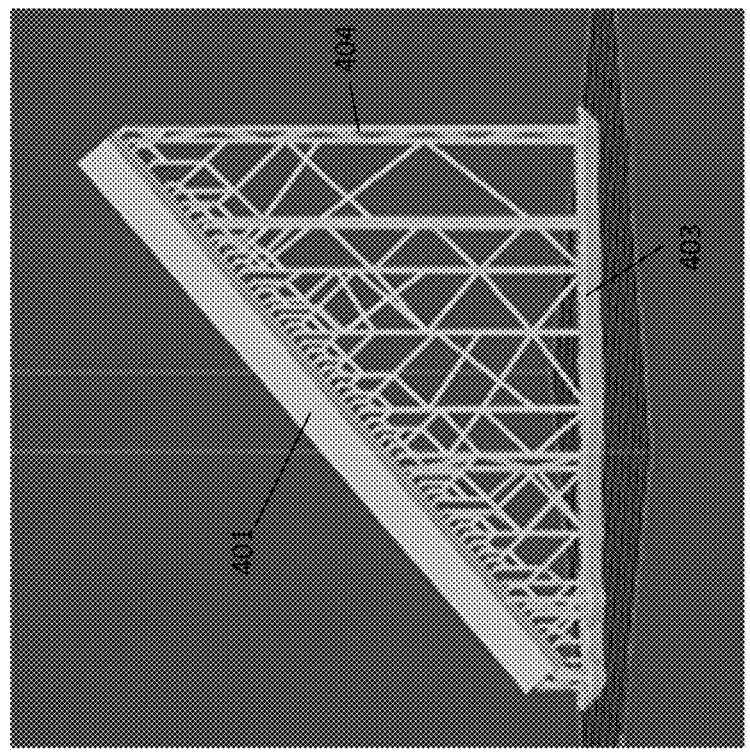

FIGS. 4A and 4B are perspective views of illustrative support structures generated for a part, according to some embodiments. In the example of FIG. 4A, a support structure in which trusses are allowed to extend throughout the support structure is depicted, whereas in FIG. 4B, a trussing line is enforced in generating the support structure and the density of trussing is increased just below the trussing line relative to the trussing in FIG. 4A.

In the example of FIG. 4A, a cuboid part 401 is configured to be fabricated in contact with a support structure 404, which comprises a raft 403. As shown in FIG. 4A, a conventional support structure may include trusses between support pillars close to the part 401, which may lead to the above-described issues with contact structures effectively acting as a unitary structure so that a comparatively high force is required to detach any one of them from the part.

In the example of FIG. 4B, a support structure 414 comprising raft 413 is configured to be fabricated in contact with the part 401. As shown in FIG. 4B, the support structure 414 comprises support pillars that are not connected to any other support pillars above a trussing line 416. Moreover, just below the trussing line 416, an increased density of trussing may be noted when compared with both the amount of trussing proximate to the part 401 in support structure 404 and in the amount of trussing at the same distance from the part in support structure 404.

Figure 5A:
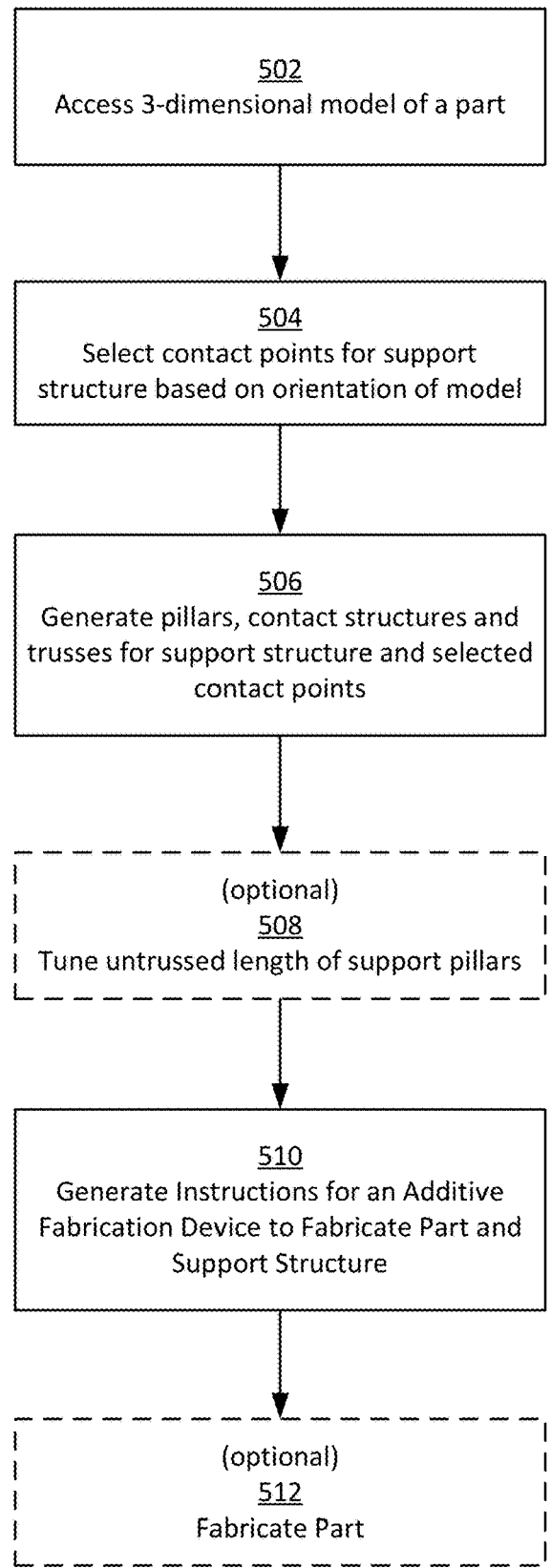
FIG. 5A is a flowchart of a method of generating a support structure comprising an untrussed region proximate to a part, according to some embodiments.

FIG. 5A is a flowchart of a method of generating a support structure comprising an untrussed region proximate to a part, according to some embodiments. Method 500 may be performed by any suitable computing system, examples of which are described below. In act 502, a 3-dimensional model of a part may be accessed. The model may describe the 3-dimensional geometry of a part in any suitable manner, and may be accessed by reading data from at least one computer readable medium or otherwise.

In act 504, a plurality of contact points upon the surface of the model are selected as being points at which support is to be provided. The points may be identified based on a selected position and/or orientation of the part, which may affect the extent to which particular regions of the part may require support during fabrication. In some cases, for instance, a user may orient the model as desired via a graphical user interface (GUI), then provide input indicating that a support structure is to be generated for the model in its present position and orientation. The software executing the GUI may then perform act 504 in response based on said input. Identification of contact points may be performed in any suitable way, including by analyzing the slope of downward-facing (e.g., facing toward a build platform) surfaces, applying one or more heuristics to layers of the part, detecting local low points, and/or by performing a Boolean comparison of sequential layers to detect unsupported areas.

In some embodiments, contact points may be identified by performing a simulation of fabrication of the part and determining which layers may experience a sufficiently high force during fabrication that support of the layer is desirable. A contact point may be identified on such a layer at a suitable exposed point on the layer (e.g., at the edge of the layer).

According to some embodiments, one or more contact points may be selected in act 504 by simulating one or more intermediate forms of the part as it is fabricated. Such a simulation may indicate the forces expected to be applied to layers of the part during fabrication and, when said forces exceed some threshold, the layer may be selected as requiring support. Such techniques may be described in U.S. Pat. No. 9,987,800, titled "Systems and Methods of Simulating Intermediate Forms for Additive Fabrication," which is hereby incorporated by reference in its entirety.

Irrespective of how the contact points are selected in act 504, in act 506 a support structure comprising support pillar structures and trusses between the pillar structures may be generated along with contact structures that connects each support pillars to a respective contact point. The above-described support tips are one example of a contact structure, although additional examples of contact structures are described below.

It may be noted that, while in at least some cases the number of support pillars in the region of the part may be equal to the number of contact structures and contact points, there may in general be more or fewer support pillars in regions further from the part since the support pillars may branch and/or connect to other support pillars in various places within the support structure. For instance, the support pillars generated in act 506 may not all extend from the associated contact structure to the bottom of the model (the bottom being the end that will, once fabricated, attach to the build platform). In some cases, support pillars may extend to a raft structure, and in some cases a support pillar may connect via a truss to another support pillar and consequently may no longer individually extend toward the bottom of the model.

Act 508 may optionally be performed in which an untrussed length of the support pillars generated in act 506 may be tuned. As discussed above, tuning the extent to which support pillars connect to other support pillars within a particular distance from the part, may produce support structures that are more easily removed after fabrication while still providing sufficient structural support during fabrication. The untrussed length, as referred to herein, represents a distance measured from the part along a support pillar, wherein trusses are not coupled to the support pillar at distances equal to or less than the untrussed length. For instance, for an untrussed length of 10 mm, a support pillar may not be connected to any trusses within 10 mm of the part, but may be connected to any number of trusses at distances from the part that are greater than 10 mm.

According to some embodiments, the untrussed length relied upon when generating the support structure in acts 504 and/or 506 may be equal to or greater than 1 mm, 2 mm, 3 mm, 3.5 mm, 4 mm, 5 mm, 6 mm, 7 mm, or 8 mm. According to some embodiments, the untrussed length relied upon when generating the support structure in acts 504 and/or 506 may be less than or equal to 8 mm, 7 mm, 6 mm, 5 mm, 4 mm, 3.5 mm, 3 mm, 2 mm, or 1 mm. Any suitable combinations of the above-referenced ranges are also possible (e.g., an untrussed length of greater than or equal to 2 mm and less than or equal to 4 mm, etc.).

According to some embodiments, the untrussed length of each support pillar within a support structure may be substantially the same as one another. For example, the untrussed lengths of the various support pillars may be within 2 mm of one other, or within 1 mm of each other.

It will be appreciated that acts 506 and 508 need not be performed as separate acts as illustrated in FIG. 5 and are illustrated as such in this example purely for purposes of explanation. For example, the support structure, including support pillars, trusses and contact structures may be generated whilst tuning the untrussed lengths of the support pillars in a unified process. Such a tuning process may be based at least in part on one or more properties of the material from which the support structure is to be fabricated (e.g., properties prior to, during and/or after curing of a liquid photopolymer), the diameter or size of the supports including the contact structure, and/or other factors related to the support requirements of the given part.

According to some embodiments, additional trussing may be generated in act 508 for one or more support pillars in regions proximate to the transition between untrussed and trussed sections of support pillars. As discussed above, the absence of trussing within a section of a support pillar (at distances less than the untrussed length) may, in at least some cases, necessitate additional trussing of that support pillar close to the untrussed section, such as just beneath the untrussed section. In cases where the untrussed lengths of the support pillars are substantially the same, this additional trussing may produce a region of additional trussing throughout a region running substantially parallel to the surface of the part. While this additional trussing may in some cases be referred to as a trussing line, such as in the example of FIG. 4B, it will be appreciated that this additional trussing region may not in general be arranged along a straight line, but may rather have a three-dimensional shape as defined by the untrussed length and the shape of the lower surface(s) of the part.

According to some embodiments, a desired untrussed length may be calculated in act 508 based on one or more factors including the force that a user's finger is capable of applying to a support pillar, the elastic modulus (e.g., Young's modulus) of the fabricated material, the spring constant of the support pillar, the radius of the support pillar, the length of the support pillar, and/or the expected tensile strength of the support pillar. For instance, a fixed-free beam under transverse tip loading may have a spring constant given by $(3 \times E \times I)/L^3$, where E is the Young's modulus of the fabricated material, I is the area moment of inertia of the beam which has a dependence on support geometry, and L is the length of the beam. Applying this to an untrussed section allows the calculation of the spring constant for a given untrussed section in terms of its length. Based on how much force and movement is required to break the support pillar from the part, the amount of transverse force required to produce such a break may be calculated as a function of the untrussed section's length. The area moment of inertia is a property of a 2-dimensional cross section of the support structure, and as may be understood the equation above is a simplified equation based on a proposed support structure that is symmetric about an axis. In some embodiments, a more complex relationship between the parameters may be evaluated that accounts for support structures that may be anisotropic about an axis such as rectangular structures, or support structures that may vary in area along the axis such as cone shaped structures. In these cases a more complex equation may be used to determine an approximate spring constant for the support.

Figure 5B:
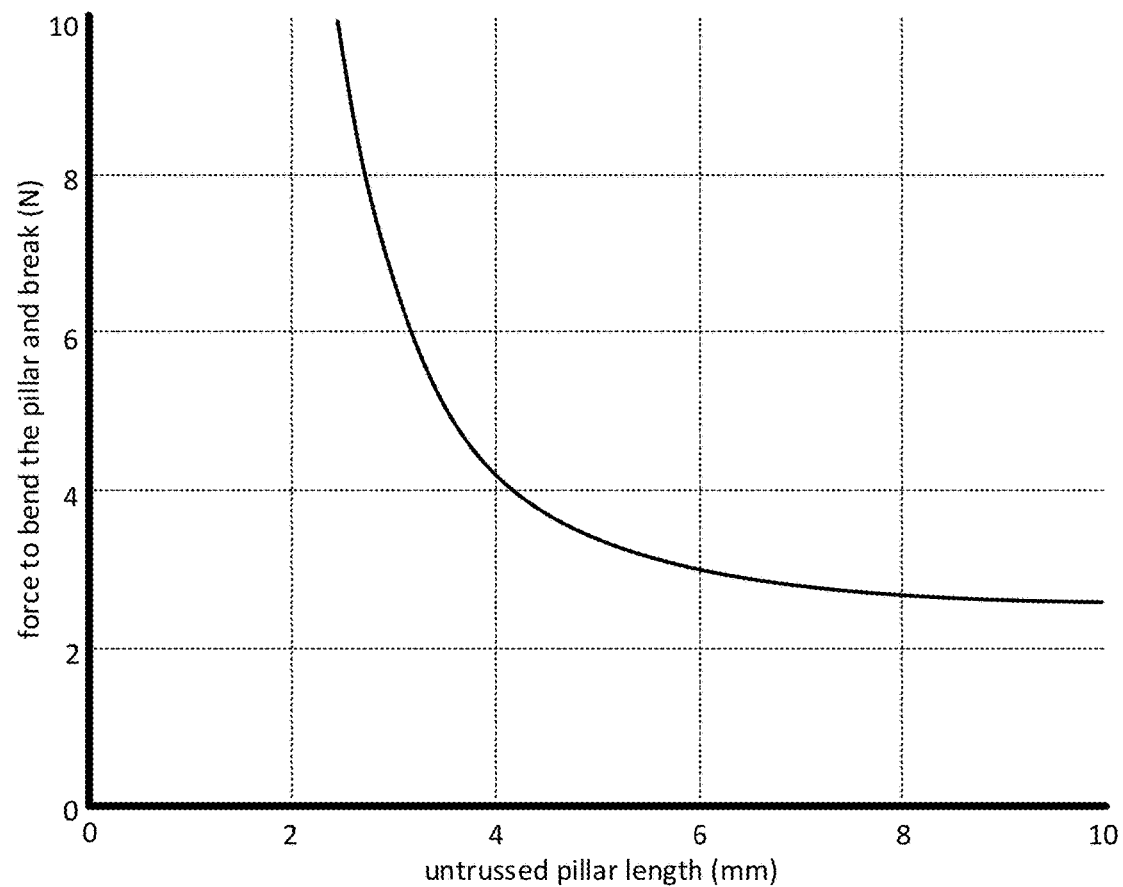
FIG. 5B is a graph showing a calculated force to remove a support from a part as a function of untrussed length, according to some embodiments.

As one example, assuming a user can comfortably push with a maximum force of 5 N, the contact structure by which a support pillar contacts a part requires 2.5 N to break, and a deflection of 0.3 mm is required to break the contact structure from the part. Based on the above formula, the force required to bend and break a support pillar from the part may be calculated as a function of the untrussed length of the support pillar as shown in FIG. 5B. Graph 550 plots this force $F(L)=(2.5 \text{ N})+((3 \times E \times I \times d)/L^3)$, where d is the deflection required to break the contact structure from the part.

In this example, it is further assumed that the radius of the pillar is 0.56 mm and has Young's modulus of 1.6 GPa. As shown in FIG. 5B, as the untrussed length gets longer, the total force required to bend the untrussed pillar and break the support structure asymptotes to the 2.5 N breaking force, whereas when the pillar is short the force increases rapidly. As such, in this example, below about a 3.5 mm untrussed length, tools may be required to separate the part from the support pillar (the total force exceeds 5 N, the maximum force a user can comfortably push with unaided by tools), whereas with a length of 6 mm or 8 mm, the total force required barely exceeds the breaking force. In cases where the support structure may be removed by a tool where the force is too high to remove manually, it may still be difficult to navigate a removal tool through the truss supports. This may still cause unwanted damage to the part surface or fine/brittle features.

According to some embodiments, an untrussed length for one or more support pillars may be selected in act 508 by determining a minimum length that can be broken by a user. In the example of FIG. 5B, for instance, the force drops below 5 N when the untrussed length is about 3.5 mm. Assuming that 5 N is the maximum force that can be applied by a user, therefore, an untrussed length of about 3.5 mm may be selected as the minimum length of an untrussed length that can be broken by a user for a given material.

In some embodiments, the loadings upon a contact structure (e.g., a support tip) may be simulated to design a directed weakness into the contact structure. Such a simulation may be based, at least in part, on the loading or range of loading that the contact structure and associated support pillar is expected to experience during different stages of the fabrication process. As one example, the untrussed section of a support pillar could be configured to have an elliptical or rectangular cross-section rather than a circular cross-section, which may allow the pillar to more freely flex in one direction or around one axis while increasing stiffness in another direction or around another axis. For example, if a fabrication process applies minimal moment to a part and the part has a large print-plane-aligned flat region with many supports, those support pillars could be thin along one of their axes so that the long axes radiate out from the center of the part, giving relatively high compliance to rotation, allowing a user to twist the part off supports. Any number of support pillars and/or trusses can be anisotropic with a consistent axis being the weak axis, and/or support pillars and/or trusses can be structured to create anisotropic regions or facilitate specific support removal techniques such as twisting.

In act 510, the computing device performing method 500 generates instructions for an additive fabrication device to fabricate the part and the generated support structure, which includes the generated support pillars, contact structures and trusses generated and/or tuned in acts 506 and 508. Act 510 may comprise a slicing process in which the combination of part and support structure is sliced into a plurality of two-dimensional sections that each represent a single layer of material to be produced during the fabrication process. Method 500 may end with act 510, or may optionally include act 512 in which the part is fabricated by executing the instructions generated in act 510 by a suitable additive fabrication device.

Figure 6B:
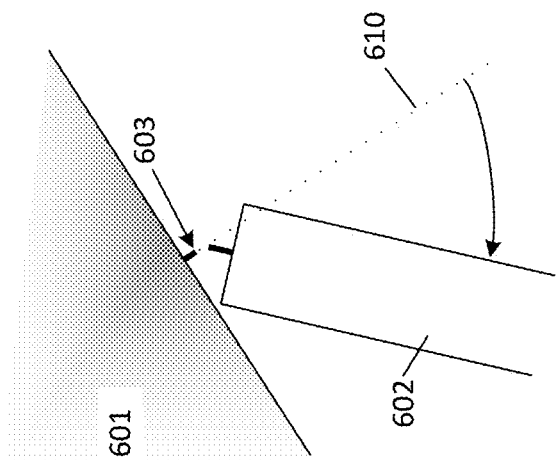
FIGS. 6A-6B depict an illustrative contact structure, according to some embodiments.
Figure 6A:
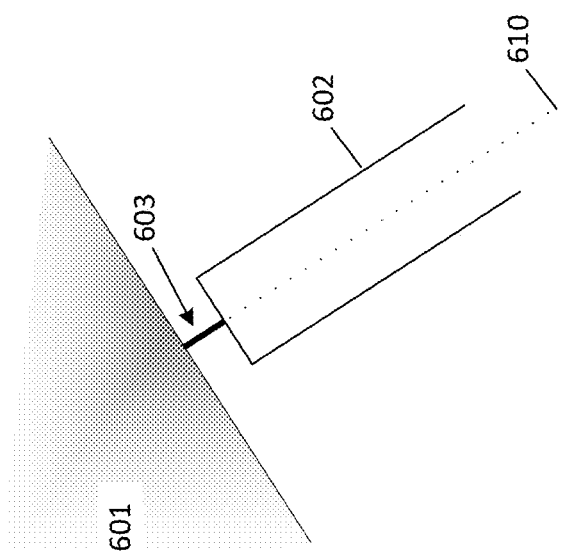

FIGS. 6A-6B depict an illustrative contact structure, according to some embodiments. As discussed above, one or more contact structures may be generated as a part of a support structure, and may couple respective support pillars to a part. FIGS. 6A and 6B depict a type of contact structure referred to herein as a "hair support," and which may be generated as part of a contact structure in, for example, act 506 of FIG. 5.

The inventors have recognized and appreciated that, to ease removal of a support structure, it may be desirable to localize stress as much as possible on the feature that is designed to break. The more stress can be concentrated, the less energy the system stores before it breaks and the less far it needs to be deflected to cause the break. That is, the farther a feature needs to be deflected before breaking, the more room there is for force to distribute across multiple contact structures, which may thereby necessitate a greater total applied force to break any one contact structure.

In the example of FIGS. 6A-6B, a hair support 603 connects a support 602 to a part 601. The support 602 may be a support pillar. In some cases, support 602 may be another type of contact structure that, instead of connecting to the part in a conventional manner, connects to the part via the small hair support 603. As one example, support 602 may be a support tip, such that the contact structure comprises both a support tip and a hair support wherein the support tip is attached to a support pillar and to the hair support, and wherein the hair support is attached to the part.

In some embodiments, the hair support 603 may be configured to be fabricated from a single layer of material by the additive fabrication device. That is, the hair support 603 may be configured to have a size that is equal to the thickness of a single layer that will be fabricated by the additive fabrication device. In some embodiments, a hair support may be configured to be fabricated thinner than a layer of material in the part. For instance, a horizontal hair support may be fabricated in whole or in part by directing less energy and/or by directing energy for less time to a region of liquid photopolymer than is directed an adjacent region to form a layer of the part. As a result, the hair support may include this region that is cured at a lower cure depth and is therefore produced thinner than regions of the layer within the part.

In the example of FIG. 6A, the hair support 603 is shown aligned with axis 610. In some embodiments, the orientation of a hair support may be determined based on a direction normal to the surface of a part. In general, however, a hair support may be oriented in any direction; due to the small size of a hair support, it may be preferable to fabricate the hair support in a direction that is enabled by the geometry of the support 602 and the part 601 whilst keeping the size of the hair support as small as possible.

As shown in FIG. 6B, due to the small size of the hair support, it may be easy for a user to break the support by moving the support 602. In some cases, such as the one illustrated in FIG. 6B, a support 602 with a blunt end can act as a fulcrum (or "pry-bar"). As shown in the example of FIGS. 6A-6B, as the part 601 rotates with respect to the support 602, the edge of the support comes in contact with the part, providing significant leverage and putting much more force on the hair than the externally-applied force. The shorter the length of the support hair, the less rotational distance the part may need to rotate to produce such leverage, although if the support hair were too short there may not be enough clearance for the part to rotate with respect to the support 602 and to thereby produce enough pressure to break the hair.

According to some embodiments, a hair support may have a length (measured between the part and the part of the support to which it is connected) greater than or equal to 2 mm, 4 mm, 6 mm, 7 mm, 8 mm, 9 mm, or 10 mm. According to some embodiments, the hair support may have a length less than or equal to 12 mm, 10 mm, 9 mm, 8 mm, 7 mm, 6 mm, or 4 mm. Any suitable combinations of the above-referenced ranges are also possible (e.g., a length of greater than or equal to 7 mm and less than or equal to 9 mm, etc.).

According to some embodiments, a support structure may be configured with a line of hair supports with the same or with different hair lengths. According to some embodiments, a support structure may be configured with hair supports having a chamfer on the blunt face of the associated support, where the length or chamfer angle sweeps across the width of the part. This configuration may allow the support hairs to break one at a time, minimizing the peak applied force required to break all of the supports (since they don't all break at the same time).

FIG. 7 illustrates an alternate support connected to a support hair, according to some embodiments. As an alternative to the support 602 shown in FIG. 6, in the example of FIG. 7, support 708 includes a vertically oriented section 708a and an obliquely-angled tip section 708b. The obliquely-angled tip section is coupled to a support hair 703 aligned along axis 710. The support hair 703 is coupled to part 701. The support 708 may be part of, or may be coupled to, a support pillar.

It may be desirable for a support structure to not be distorted during fabrication, particularly if there is a cycling load upon the structure. For instance, if a support is connected to a part at an angle, then turns to run vertically down to the build platform, applying a force at the tip of the support that is normal to the build platform will apply a moment about the angle, bending the support. This may reduce the stiffness of the contact structure during fabrication and/or may result in a cyclic bending of the structure at every layer.

The inventors have recognized and appreciated that, using a model of the fabrication process, the forces applied to a given contact structure may be anticipated based on a support structure and the part. In particular, the inventors have recognized that an obliquely-angled tip section such as shown in FIG. 7 may cause forces to be applied directly along a support, such as along axis 711, and may not apply a bending moment to the support during fabrication. This may allow, in at least some cases, for the contact structure to remain optimally small or thin while still translating the forces appropriately.

For instance, in the example of FIG. 7, a force applied to the support hair 703 along axis 710 during fabrication may cause a net force to be applied to the vertically oriented section 708a along axis 711. In contrast, the same force applied to a support hair coupled to a support without the obliquely-angled tip section 708b (e.g., the support in FIGS. 6A-6B) may produce the net moment described above that may bend the support.

In some embodiments, support hair 703 may be configured so as to be oriented normal to the surface of the part 701, which may allow the support structure to be kept sufficiently far from the part to prevent unwanted interference of the support structure with the part geometry. In some embodiments, the support structure, including the support hair 703 may be configured with dimensions so as to produce a support structure that will reduce or eliminate the potential moment experienced by the support structure. For example, by configuring the shape of the support structure based on the direction of forces acting on the support structure during fabrication, it may be possible to reduce or eliminate any moment experienced through the support structure.

In some embodiments, a support structure may be configured to align the structure with a loading force applied during fabrication in order to avoid a bending moment during the restoring force. This may be achieved by adjusting the shape of the support structure or adding additional material to counter balance any resulting force or moment that may be applied to the support structure during fabrication. With reference to FIG. 7, for instance, the relative position of the vertically oriented section 708a and axis 711 are such that, when a force is applied along axis 711, there will be no bending moment applied to the vertically oriented section 708a. In contrast, if the vertically oriented section 708a were positioned further from axis 711 while still connecting to the part 701 using support hair 703 as shown in FIG. 7, there may be such a bending moment applied during fabrication.

Figure 8:
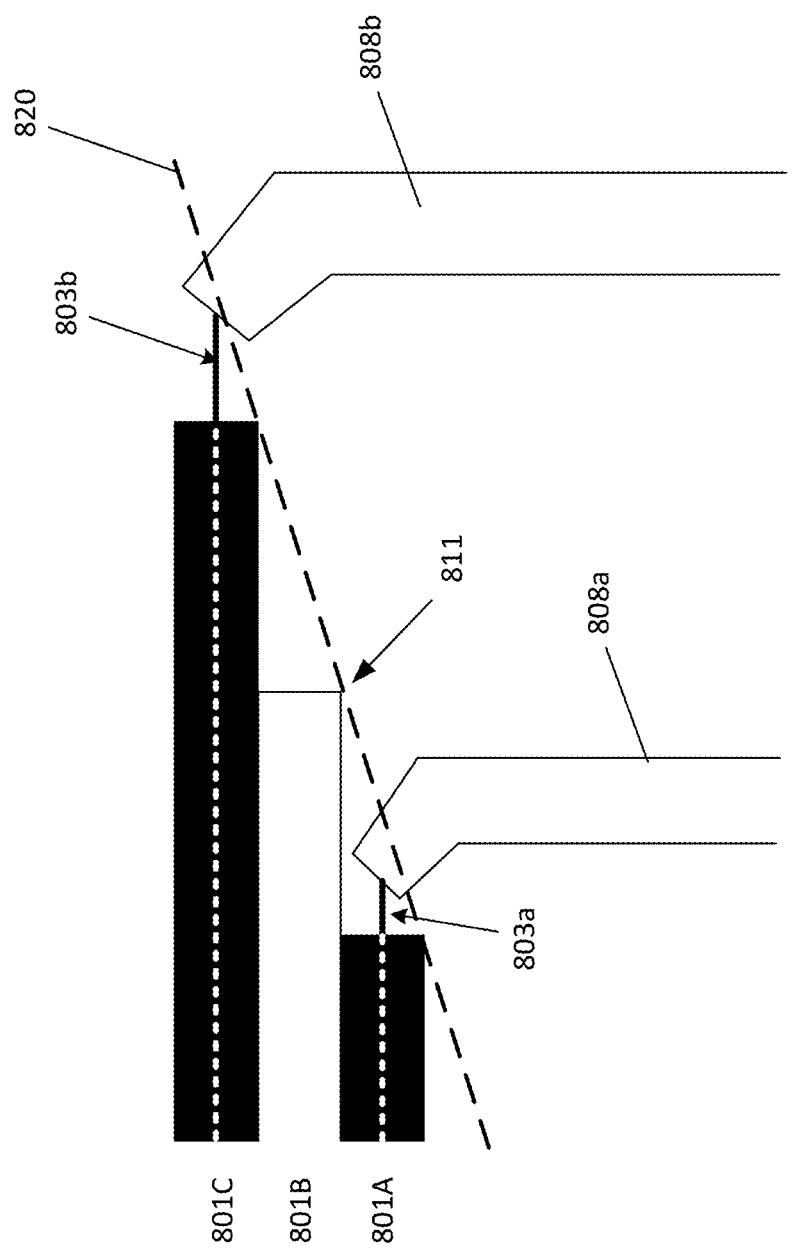
FIG. 8 illustrates a portion of a support structure coupled to layers of a part to illustrate differences between simulation and fabrication, according to some embodiments.

FIG. 8 illustrates a portion of a support structure coupled to layers of a part to illustrate differences between simulation and fabrication, according to some embodiments. The inventors have recognized and appreciated that, while it may be more computationally efficient (and even qualitatively correct) to perform a simulation of fabrication of a part for only some layers of the part, this may introduce numerous problems.

First, rapid changes in object geometry (e.g., shallow slopes or overhangs) can happen from layer to layer that may be missed by simulating only at multiples of layers. For instance, rapid changes in area may occur in an earlier layer than when it is analyzed in a simulation that simulates only at multiples of layer. This may cause a simulation to conclude that supports were not needed when in fact they were, or may cause supports to be placed sub optimally between layers or features.

In FIG. 8, layers 801A, 801B and 801C represent the edges of fabricated layers, whereas the supports 808a and 808b with associated support hairs 803a and 803b, respectively, represent simulated structure. The supports 808a, 808b and support hairs 803a, 803b are simulated for layers 801A and 801C as denoted by the associated dashed white lines. Between the two simulated layers 801A and 801C, layer 801B may overhang at 811 such that the print may fail due to an unsupported overhanging layer. There is an entire layer that is not connected to a support at this edge.

Moreover, in some situations a simulated support may misalign with a slicing process (the process of generating two-dimensional images for fabricating each layer). For instance, where a support connects to a part at a location not aligned with a layer during slicing, the geometry produced from the two-dimensional images from slicing may result in a support that does not connect to the part because the contact part is not centered within the slice.

For at least the above-reasons, a simulation of a support structure may be performed at the same level of granularity as a subsequent slicing operation. When generating a support structure, therefore, the support structure may be generated based at least in part on a simulation of the support structure for a plurality of layers that match the positions of layers that will be produced by slicing prior to fabrication. Acts 504, 506 and/or 508 of method 500 shown in FIG. 5, for example, may simulate the support structure for purposes of selecting contact points for a support structure, generating support pillars and trusses, etc. by simulating fabrication at the same level of granularity as is used to slice the part and support structure in act 510.

Figure 11C:
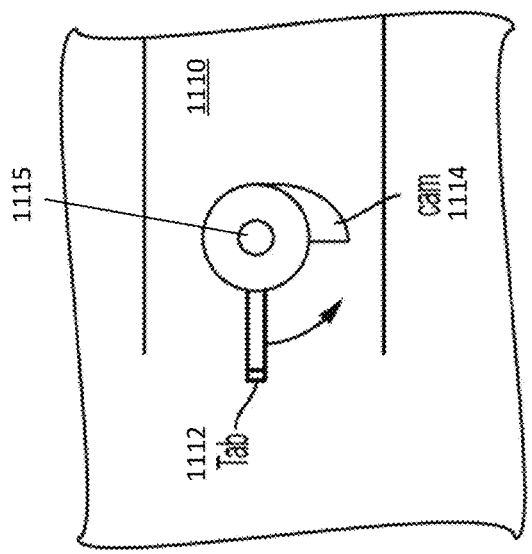
FIGS. 11A-11C depict various views of a support structure that includes a removal component, according to some embodiments.
Figure 11B:
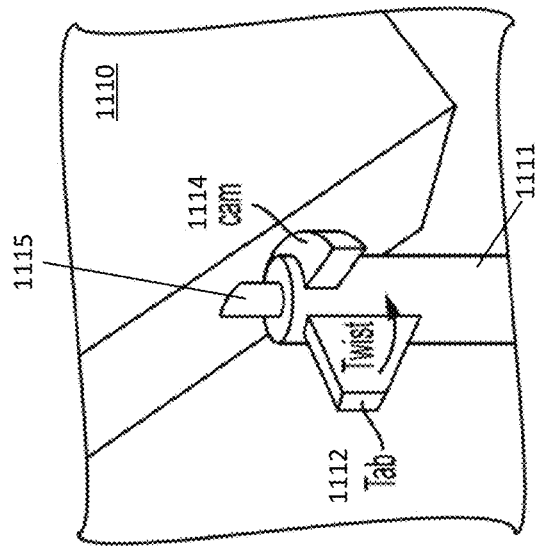
Figure 11A:
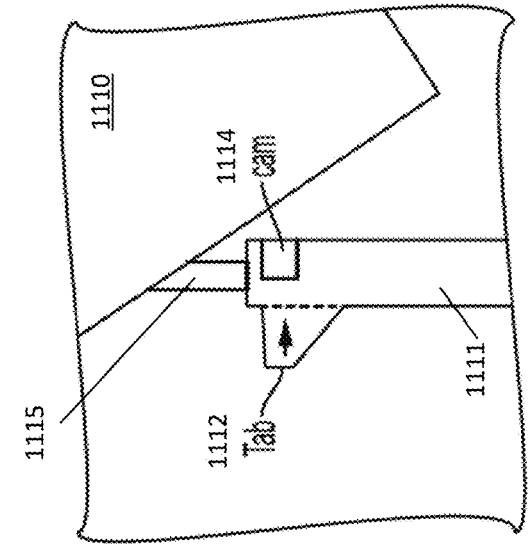

In some embodiments it may be favorable to include specific structures on the support to aid removal such as cams or tabs to increase the area that may be acted upon by a finger or tool and facilitate the desired rotational movement required for removal. FIGS. 11A-11C depict an example of such a structure, according to some embodiments. In the example of FIGS. 11A, 11B and 11C, which illustrate front, perspective, and top view, respectively, a support structure for a part 1110 comprises a support pillar 1111 and a contact structure 1115. The support pillar comprises a removal structure comprising a tab 1112 proximate to the contact structure 1115 that provides a place for a user to push and/or twist to remove the contact structure from the part. In addition, the example of FIGS. 11A-11C includes a cam 1114 which pushes off the part when the support is twisted using the tab.

According to some embodiments, a support structure (e.g., support pillars of the support structure) may be configured to include any number of tabs and/or cams. Both features may improve the application of forces so that the force used for removal is directed or applied more efficiently to allow for removal while limiting energy build up and limiting the risk of support snapping and flying out which may cause injury to the user removing supports or someone else.

Figure 9:
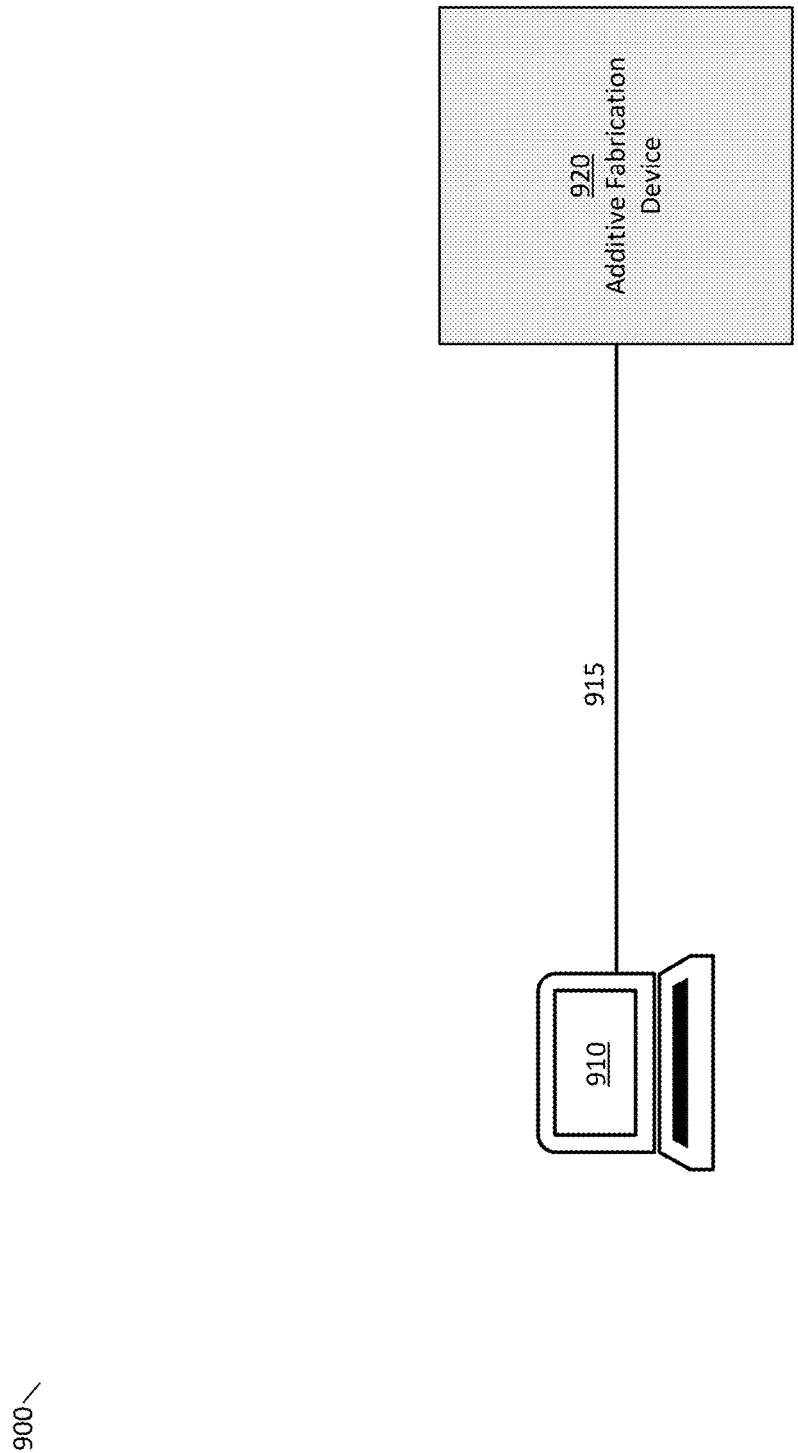
FIG. 9 illustrates an example of a computing system environment on which aspects of the invention may be implemented.

FIG. 9 is a block diagram of a system suitable for practicing aspects of the invention, according to some embodiments. System 900 illustrates a system suitable for generating instructions to perform additive fabrication by an additive fabrication device and subsequent operation of the additive fabrication device to fabricate a part. For instance, instructions to fabricate a part and a support structure as described by the various techniques above may be generated by the system and provided to the additive fabrication device. Various parameters associated with generating a support structure may be stored by system computer system 910 and accessed when generating instructions for the additive fabrication device 920.

It will be appreciated that any of the above-described techniques to generating a support structure may be combined in any suitable manner and in any suitable order. According to some embodiments, computer system 910 may execute software that generates instructions for fabricating a part using additive fabrication device, such as method 500 shown in FIG. 5. Said instructions may then be provided to an additive fabrication device, such as additive fabrication device 920, via link 915, which may comprise any suitable wired and/or wireless communications connection. In some embodiments, a single housing holds the computing device 910 and additive fabrication device 920 such that the link 915 is an internal link connecting two modules within the housing of system 900.

Figure 10:
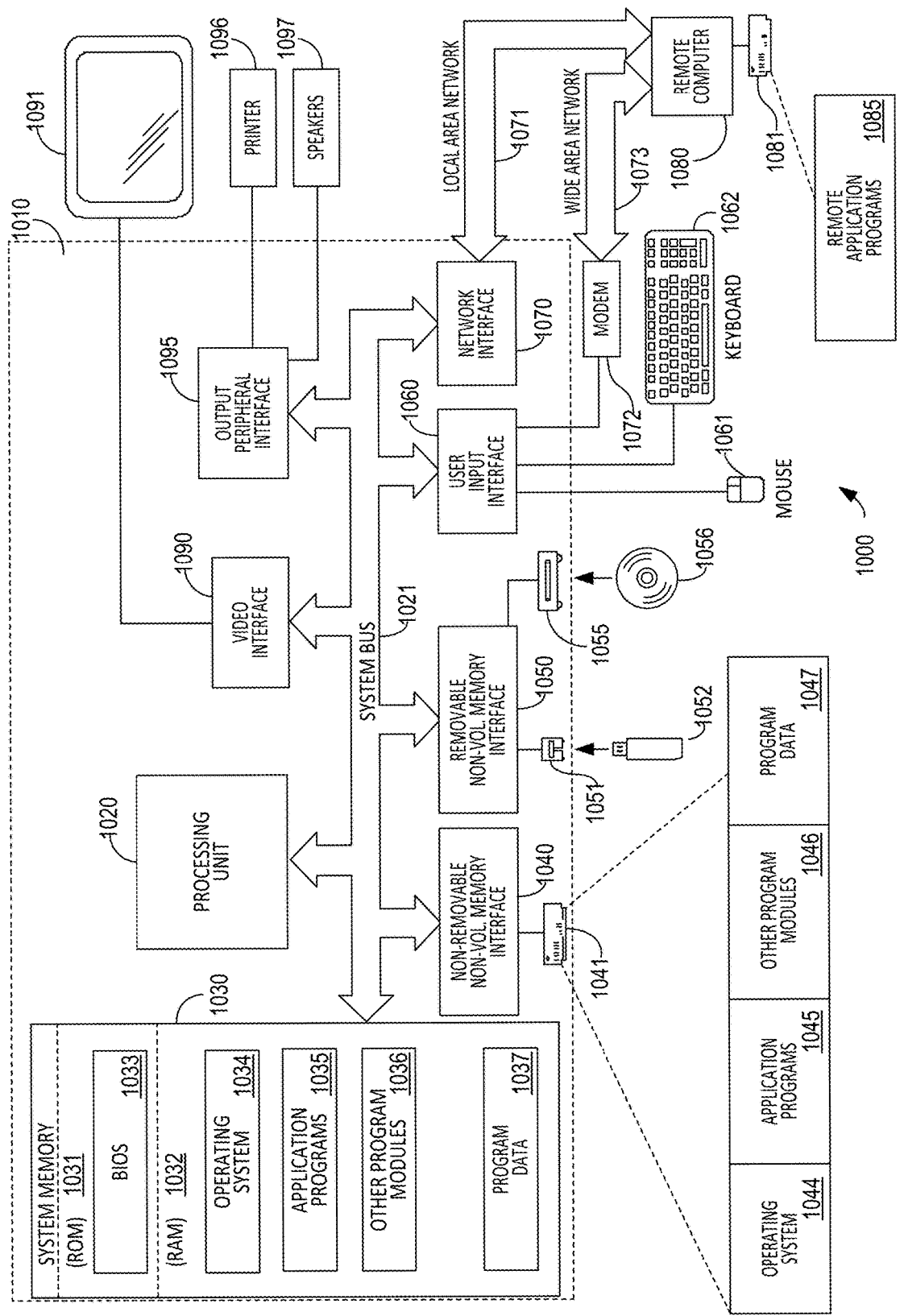
FIG. 10 illustrates an example of a computing system environment on which aspects of the invention may be implemented.

FIG. 10 illustrates an example of a suitable computing system environment 1000 on which the technology described herein may be implemented. For example, computing environment 1000 may form some or all of the computer system 910 shown in FIG. 9. The computing system environment 1000 is only one example of a suitable computing environment and is not intended to suggest any limitation as to the scope of use or functionality of the technology described herein. Neither should the computing environment 1000 be interpreted as having any dependency or requirement relating to any one or combination of components illustrated in the exemplary operating environment 1000.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the technology described herein includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a flash drive 1051 that reads from or writes to a removable, nonvolatile memory 1052 such as flash memory, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a non-transitory computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software," when used herein, are used in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of generating a support structure for an object, the object represented by a three-dimensional (3D) model, the support structure and the object to be fabricated via additive fabrication, the method comprising:
generating, using at least one processor, a 3D model representing the support structure for the object, wherein the 3D model representing the support structure comprises:
a plurality of support pillars;
a plurality of contact structures coupling support pillars of the plurality of support pillars to the object, wherein an orientation of each contact structure of the plurality of contact structures is determined based on a direction normal to the surface of the object at a point of contact between the contact structure and the object; and
a plurality of trusses, wherein trusses of the plurality of trusses couple to different support pillars of the plurality of support pillars at opposing ends of the truss,
wherein the support structure exhibits an untrussed region proximate to the object, which includes the plurality of contact structures and at least part of each of the plurality of support pillars, and which does not include any of the plurality of trusses,
wherein generating the 3D model representing the support structure for the object comprises, for each truss of the plurality of trusses, determining placement of the truss while only permitting the truss to couple to support pillars at or beyond an untrussed length, the untrussed length being a threshold distance from the object measured along the support pillars to which the truss is coupled, and
wherein the placement of each of the plurality of trusses is determined based on the same untrussed length;
generating instructions for an additive fabrication device that, when executed by the additive fabrication device, cause the additive fabrication device to fabricate the object and the support structure according to the 3D model representing the object and the 3D model representing the support structure;

executing the instructions by the additive fabrication device to fabricate the object and the support structure; and removing the fabricated support structure from the fabricated object.

2. The method of claim 1, further comprising calculating the untrussed length based at least in part on an elastic modulus of a material from which the object is to be fabricated and/or an expected tensile strength of support pillars of the plurality of support pillars.

3. The method of claim 1, further comprising calculating the untrussed length based at least in part on an expected force that a user is capable of manually applying to a support pillar of the support structure after fabrication.

4. The method of claim 1, wherein the plurality of trusses are a first plurality of trusses, wherein said placement of the trusses of the first plurality of trusses relative to the object is determined based at least in part on a first untrussed length for a first region of the object, and wherein placement of trusses of a second plurality of trusses is based at least in part on a second untrussed length, different from the first untrussed length, for a second region of the object.

5. The method of claim 1, wherein the plurality of contact structures comprise a plurality of support hairs.

6. The method of claim 5, wherein the instructions, when executed by the additive fabrication device, cause the additive fabrication device to fabricate the object and the support structure from a plurality of layers having a first thickness, and wherein support hairs of the plurality of support hairs are configured to have a thickness less than the first thickness.

7. The method of claim 1, wherein each of the trusses of the plurality of trusses couples to support pillars at distances measured along the support pillars from the object greater than the untrussed length.

8. The method of claim 1, wherein the support structure further comprises a raft structure, and wherein some, but not all, of the plurality of support pillars are coupled to the raft structure.

9. The method of claim 8, wherein the support pillars that are not coupled to the raft structure are coupled at one end to one of the plurality of trusses and at the other end to one of the plurality of contact structures.

10. The method of claim 1, wherein the support structure further comprises a raft structure, and wherein at least some of the plurality of support pillars are coupled to the raft structure.

11. The method of claim 1, wherein a first support pillar of the plurality of support pillars comprises a tip section aligned parallel to a surface of the object, and wherein a first contact structure of the plurality of contact structures is coupled to the tip section of the first support pillar and to the object.

12. The method of claim 11, wherein the tip section of the first support pillar is coupled to a neighboring section of the first support pillar at an oblique angle.

\* \* \* \* \*